UNITED STATES PATENT OFFICE 2,683,744

N-ALKOXYALKYL-β-HALOETHYLAMINES

James F. Kerwin and Glenn E. Ullyot, Philadelphia, Pa., assignors to Smith, Kline & French Laboratories, Philadelphia, Pa., a corporation of Pennsylvania No Drawing. Application February 13, 1953, Serial No. 336,874

6 Claims. (Cl. 260—570.9)

This invention relates to certain new chemical compounds, more particularly certain new N-alkoxyalkyl-β-haloethylamines and organic and inorganic salts thereof.

The new chemical compounds according to this invention have utility as physiologically active agents, for example, as adrenergic blocking agents and antihistaminic agents. The adrenergic blocking activity of the compounds of this invention is particularly great when the compounds are administered intravenously. The compounds of this invention are potent antihistaminic agents when administered either parenterally or orally.

The new compounds according to this invention have the structure shown in the following formula:

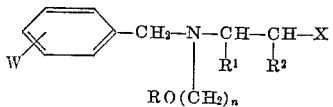

in which W is a member of the group consisting of hydrogen, methoxy, methyl, chlorine and bromine; R is a member of the group consisting of methyl and ethyl; $n$ is 2 or 3; $R^1$ and $R^2$ are members of the group consisting of hydrogen and methyl and X is a member of the group consisting of chorine and bromine.

Where hereinafter the symbols W, R, $n$, $R^1$, $R^2$ and X are mentioned in the description, they will indicate the substituents indicated for them in connection with the above general formula.

The organic and inorganic salts of the free base of the above formula contemplated by this invention include by way of example salts of the base formed with organic acids such as, for example, tartaric, oxalic, maleic, camphor-sulfonic, etc., and inorganic acids such as, for example, sulfamic, hydrochloric, hydrobromic, sulfuric, phosphoric, phosphonic, etc. More specifically, the inorganic and organic salts will be such as are prepared with organic and inorganic acids having an ionization constant not less than $1 \times 10^{-3}$ at 25° C. The compounds in accordance with this invention can be readily prepared using well known materials by following the below listed steps:

Step 1.—A mixture of an aromatic aldehyde having the formula

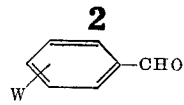

and an amino alcohol having the formula

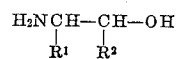

is catalytically reduced utilizing hydrogen and platinum as a catalyst to form a secondary amine having the formula

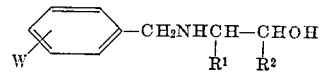

The aromatic aldehyde may be for example, benzaldehyde or ortho, meta or para forms of, for example, bromobenzaldehyde, chlorobenzaldehyde, methoxybenzaldehyde or methylbenzaldehyde, depending upon the desired end product.

Step 2.—The secondary amine produced in the first step is alkylated with an alkoxyalkyl halide having the formula RO(CH₂)$_n$X to form an alcohol having the formula

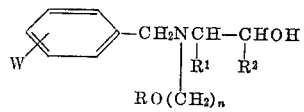

This reaction may be carried out without a solvent at approximately 120–160° C., or within the same temperature range in a solvent such as toluene or xylene. An excess of secondary amine or an acid binding agent, such as potassium or sodium carbonate may be employed. The following alkoxy alkyl halides are illustrative methoxyethyl bromide
    ethoxyethyl bromide
    1-methoxy-2-chloropropane
    1-ethoxy-2-chloropropane
    2-methoxy-1-bromopropane
    2-ethoxy-1-bromopropane
    3-methoxy-1-bromopropane
    3-ethoxy-1-bromopropane Step 3.—The alcohol formed in Step 2 is treated with thionyl chloride or thionyl bromide to form the final product having the general formula for the compounds of this invention set forth above. The compounds obtained from this final reaction is the hydrohalide salt. This salt may be converted into the free base by treatment with an inorganic base as sodium or potassium hydroxide. The free base thus produced can readily be converted into the desired salt by reaction with the appropriate acid.

The following examples will be illustrative of compounds of this invention and the procedure for their preparation and will, it is believed, serve to make fully apparent all of the compounds embraced by the general formula given above and the preparation thereof respectively.

EXAMPLE 1

*N-benzyl-N-ethoxyethyl-β-cholorethylamine hydrochloride*

A solution of 1.5 moles of benzaldehyde and 1.5 moles of ethanolamine in 200 ml. of ethyl alcohol is hydrogenated over 0.5 g. of platinum oxide catalyst at 500 lbs. pressure. The theoretical amount of hydrogen is taken up in a few hours. The solution is filtered and distilled to obtain benzylaminoethanol distilling at 158–161° C. at 17 mm.

A mixture of 1.2 moles of benzylaminoethanol and 300 ml. of xylene is heated to reflux while 0.6 mole of ethoxyethyl bromide is added dropwise with stirring. After the addition is completed, the mixture is refluxed for 6 hours. When the mixture has cooled the benzylaminoethanol hydrobromide is collected and the filtrate is extracted with 300 ml. of dilute hydrochloric acid. The acid solution is made basic with sodium hydroxide, the oil is extracted into ether, dried and distilled to yield N-benzyl-N-ethoxyethyl aminoethanol boiling at 100–105° C. at 0.2 mm.

Dry hydrogen chloride is passed into a solution of 100 g. of the above amino alcohol in 300 ml. of chloroform until the solution is acid. Then 60 g. of thionyl chloride is added in portions, the solution is heated slowly and finally refluxed for 2 hours. Removal of the solvent leaves N-benzyl-N-ethoxyethyl-β-chloroethylamine hydrocloride which is recrystallized from alcohol and ether, M. P. 134–135° C.

To prepare the free base, 2 g. of the hydrochloride salt is added to 25 ml. of water containing one equivalent of sodium bicarbonate. The mixture is extracted with ether and the ether solution is dried over magnesium sulfate. The free base is recovered by evaporating the solvent.

In the preparation of the maleate salt, an excess of maleic acid in ether is added to a dry ethereal solution of the free base. The maleate salt precipitates immediately from the ether solution.

EXAMPLE 2

*N-(p-methoxybenzyl)-N-methoxyethyl-β-chloroethylamine hydrochloride*

This compound is prepared using the identical procedure set forth in Example 1, with the exception that p-methoxybenzaldehyde is used instead of benzaldehyde in order to prepare N-(p-methoxybenzyl)-aminoethanol and methoxyethyl bromide is used instead of ethoxyethyl bromide in order to prepare N-(p-methoxybenzyl)-N-methoxyethylaminoethanol.

N-(p-methoxybenzyl) - N - methoxyethyl - β-chloroethylamine hydrochloride is converted to the free base by adding sodium bicarbonate to an aqueous solution or suspension of the hydrochloride salt and extracting with ether. On evaporation of the ether the free base is obtained. The oxalate salt is prepared by mixing the free base and oxalic acid in ethyl alcohol and diluting with ether.

EXAMPLE 3

*N-(o - methylbenzyl) - N - (γ - ethoxypropyl) -β-chloroethylamine hydrochloride*

This compound is made following the identical procedure of Example 1, with the exception that o-methylbenzaldehyde is substituted for benzaldehyde in order to form N-(o-methylbenzyl)-aminoethanol and γ-ethoxypropyl bromide is substituted for ethoxyethyl bromide in order to form N-(o-methylbenzyl) - N -(γ-ethoxypropyl) - aminoethanol.

EXAMPLE 4

*N-benzyl - N -(methoxyisopropyl)-β-chloroethylamine hydrochloride*

In the preparation of this compound 1 mole of 1-methoxy-2-chloropropane is added to benzylaminoethanol in xylene and the mixture is stirred and refluxed for 20 hours. The thus formed N-benzyl-N-(methoxyisopropyl) aminoethanol is isolated and treated with thionyl chloride in chloroform solution to form the above named compound.

EXAMPLE 5

*N-(p-chlorobenzyl) - N - (γ - methoxypropyl) -β-chloroethylamine hydrochloride*

This compound is made using the identical procedure of Example 1, with the exception that p-chlorobenzaldehyde is substituted for benzaldehyde in order to form N-(p-chlorobenzyl) aminoethanol and γ-methoxypropyl bromide is used instead of ethoxyethyl bromide in order to form N-(p-chlorobenzyl)-N-(γ-methoxypropyl)-aminoethanol.

EXAMPLE 6

*N-(m-bromobenzyl) - N - (β-methoxypropyl) -β-chloroethylamine hydrochloride*

This compound is made using the identical procedure of Example 1, with the exception that m-bromobenzaldehyde is substituted for benzaldehyde in order to form N-(m-bromobenzyl) aminoethanol and 2-methoxy-1-bromopropane is used instead of ethoxyethyl bromide in order to form N-(m-bromobenzyl) - N - (β-methoxypropyl)-aminoethanol.

EXAMPLE 7

*N-benzyl-N-(β - ethoxypropyl)-1-amino-2-chloropropane hydrochloride*

In order to prepare this compound an alcoholic solution of equimolar quantities of benzaldehyde and 1-amino-2-propanol is hydrogenated over platinum at 60 lbs. pressure. 1-benzylamino-2-propanol is recovered by distillation and then alkylated with 2-ethoxy-1-bromopropane in xylene solution as described in Example 1 to form N-benzyl-N-(β-ethoxypropyl)-1-amino-2-propanol. The desired end product is formed by treating this amino alcohol with thionyl chloride as described in Example 1.

EXAMPLE 8

*N-benzyl-N-ethoxyethyl - 2 - amino-1-chloropropane hydrochloride*

This compound is formed using the identical procedure set forth in Example 1, except that 2-amino-1-propanol is substituted for ethanolamine.

EXAMPLE 9

N-benzyl-N-ethoxyethyl-β-bromoethylamine hydrobromide

The hydroxy group of N-benzyl-N-ethoxyethylaminoethanol, an intermediate in the preparation of Example 1, is replaced by heating the aminoalcohol with a slight excess of thionyl bromide in chloroform solution. Removal of the solvent leaves the desired β-bromoethylamine hydrobromide which is recrystallized from alcohol and ether.

It will be appreciated that the specific examples given above are by way of illustration and it is not desired to be limited except as set forth in the following claims.

What is claimed is:

1. A compound of the class consisting of a free base and the acid addition salts thereof, the free base having the formula:

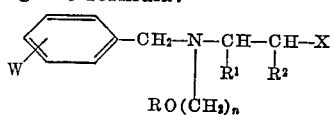

in which W is selected from the group consisting of hydrogen, methoxy, methyl, chlorine and bromine; R is selected from the group consisting of methyl and ethyl; $n$ is an integer selected from the group consisting of 2 and 3; $R^1$ and $R^2$ are selected from the group consisting of hydrogen and methyl and X is selected from the group consisting of chlorine and bromine.

2. N-benzyl-N-ethoxyethyl-β-chloroethylamine hydrochloride.

3. N - (p-methoxybenzyl) -N-methoxyethyl-β-chloroethylamine hydrochloride.

4. N - benzyl-N-(methoxyisopropyl)-β-chloroethylamine hydrochloride.

5. N - benzyl-N -(β-ethoxypropyl) -1-amino-2-chloropropane hydrochloride.

6. N-benzyl - N - ethoxyethyl - β - bromoethylamine hydrobromide.

No references cited.